United States Patent
Shatsky

(10) Patent No.: US 11,630,773 B1
(45) Date of Patent: Apr. 18, 2023

(54) UTILIZING A PERSISTENT WRITE CACHE AS A REDO LOG

(71) Applicant: Dell Products L.P., Round Rock, TX (US)

(72) Inventor: Yosef Shatsky, Karnei Shomron (IL)

(73) Assignee: Dell Products L.P., Round Rock, TX (US)

(*) Notice: Subject to any disclaimer, the term of this patent is extended or adjusted under 35 U.S.C. 154(b) by 0 days.

(21) Appl. No.: 17/569,198

(22) Filed: Jan. 5, 2022

(51) Int. Cl.
*G06F 12/08* (2016.01)
*G06F 12/0802* (2016.01)

(52) U.S. Cl.
CPC ...... *G06F 12/0802* (2013.01); *G06F 2212/60* (2013.01)

(58) Field of Classification Search
CPC .................. G06F 12/0802; G06F 2212/60
See application file for complete search history.

(56) References Cited

U.S. PATENT DOCUMENTS

| | | | |
|---|---|---|---|
| 5,381,539 A | 1/1995 | Yanai et al. | |
| 5,551,003 A | 8/1996 | Mattson et al. | |
| 5,764,880 A | 6/1998 | Gerdt et al. | |
| 6,052,799 A | 4/2000 | Li et al. | |
| 6,941,420 B2 | 9/2005 | Butterworth et al. | |
| 8,843,676 B2 | 9/2014 | Rajamanickam et al. | |
| 9,372,751 B2 | 6/2016 | McNutt | |
| 9,514,014 B2 | 12/2016 | Webman et al. | |
| 9,892,045 B1 | 2/2018 | Douglis et al. | |
| 10,078,598 B1 | 9/2018 | Wallace et al. | |
| 10,095,595 B2* | 10/2018 | Gupta ............ G06F 11/2094 | |
| 10,331,561 B1 | 6/2019 | Shilane et al. | |
| 10,445,180 B2 | 10/2019 | Butterworth et al. | |

(Continued)

FOREIGN PATENT DOCUMENTS

WO 2015108670 A1 7/2015
WO PCT/US2019/024885 1/2020

(Continued)

OTHER PUBLICATIONS

Dell EMC, "Dell EMC VxRack FLEX," Dell EMC Product Overview, 2018, 5 pages.

(Continued)

*Primary Examiner* — Jae U Yu
(74) *Attorney, Agent, or Firm* — Ryan, Mason & Lewis, LLP

(57) ABSTRACT

A storage control system receives a first write request and a second write request following the first write request. The first and second write requests comprise respective first and second data items for storage to a primary storage. First and second cache write operations are performed in parallel to write the first and second data items a persistent write cache. The first cache write operation comprises a split write operation which comprises writing a parsing header for the first data item to the write cache, and writing a payload of the first data item to the write cache. The second cache write operation comprises storing the second data item and associated metadata in the write cache, and waiting for an acknowledgment that the parsing header for the first data item has been successfully stored in the write cache before returning an acknowledgment indicating successful storage of the second data item.

20 Claims, 5 Drawing Sheets

(56) References Cited

U.S. PATENT DOCUMENTS

| | | | |
|---|---|---|---|
| 10,986,174 | B1 | 4/2021 | Sharma et al. |
| 11,119,668 | B1 | 9/2021 | Keller et al. |
| 11,144,399 | B1 | 10/2021 | Yarimi et al. |
| 11,163,479 | B2 | 11/2021 | Lieblich et al. |
| 11,163,699 | B2 | 11/2021 | Keller et al. |
| 2002/0032835 | A1 | 3/2002 | Li et al. |
| 2008/0021853 | A1 | 1/2008 | Modha et al. |
| 2009/0204761 | A1 | 8/2009 | Caprioli et al. |
| 2009/0276593 | A1 | 11/2009 | Jacobson et al. |
| 2013/0305002 | A1 | 11/2013 | Hallak et al. |
| 2014/0215147 | A1 | 7/2014 | Pan |
| 2014/0215262 | A1 | 7/2014 | Li et al. |
| 2014/0244935 | A1 | 8/2014 | Ezra et al. |
| 2016/0103764 | A1 | 4/2016 | Banerjee et al. |
| 2018/0113640 | A1 | 4/2018 | Fernandez et al. |
| 2018/0267893 | A1 | 9/2018 | Barzik et al. |
| 2018/0300075 | A1 | 10/2018 | Fernandez et al. |
| 2019/0163587 | A1 | 5/2019 | Anna et al. |
| 2019/0227845 | A1 | 7/2019 | Sridhar et al. |
| 2020/0133503 | A1 | 4/2020 | Sun et al. |
| 2021/0279187 | A1 | 9/2021 | Puder et al. |
| 2021/0294505 | A1 | 9/2021 | Keller et al. |
| 2021/0294774 | A1 | 9/2021 | Keller et al. |
| 2021/0294775 | A1 | 9/2021 | Keller et al. |
| 2021/0303160 | A1 | 9/2021 | Lieblich et al. |
| 2021/0303169 | A1 | 9/2021 | Tagar et al. |
| 2021/0303202 | A1 | 9/2021 | Ben Zeev et al. |
| 2021/0303401 | A1 | 9/2021 | Yarimi et al. |
| 2021/0303407 | A1 | 9/2021 | Keller et al. |
| 2021/0303480 | A1 | 9/2021 | Keller et al. |
| 2021/0373796 | A1 | 12/2021 | Matosevich et al. |

FOREIGN PATENT DOCUMENTS

| | | |
|---|---|---|
| WO | PCT/US2019/024900 | 1/2020 |
| WO | 2020204880 A1 | 10/2020 |
| WO | 2020204882 A1 | 10/2020 |

OTHER PUBLICATIONS

G. Soundararajan et al., "Dynamic Resource Allocation for Database Servers Running on Virtual Storage," FAST 2009: Proceedings of the 7th conference on File and storage technologies, Feb. 2009, pp. 71-84.

Dell EMC, "EMC ScaleIO Basic Architecture Documentation," Technical White Paper, Mar. 2017, 22 pages.

EMC2, "EMC ScaleIO Design Considerations and Best Practices," Technical White Paper, Jun. 2016, 30 pages.

I. Koltsidas et al., "SoftwAre Log-Structured Array (SALSA)—A Unified Stack for SSDs and SMR Disks," IBM Research Report, Dec. 2, 2015, 13 pages.

S. M. Rumble et al., "Log-Structured Memory for DRAM-Based Storage," Proceedings of the 12th USENIX Conference on File and Storage Technologies, Santa Clara, CA, Feb. 17-20, 2014, 17 pages.

Dell EMC, "Dell EMC VxFlex Family Overview," Technical White Paper, May 2019, 44 pages.

J. Nakano et al., "ReViveI/O: Efficient Handling of I/O in Highly-Available Rollback-Recovery Servers," HPCA, 10.1109/2006.1598129, pp. 200-211.

Wikipedia, "Raft (Computer Science)," https://en.wikipedia.org/wiki/Raft_(computer_science), Feb. 10, 2020, 4 pages.

Wikipedia, "Paxos (Computer Science)," https://en.wikipedia.org/wiki/Paxos_(computer_science), Dec. 6, 2019, 21 pages.

Wikipedia, "State Machine Replication," https://en.wikipedia.org/wiki/State_machine_replication, Dec. 14, 2019, 9 pages.

Dell Technologies, "Dell EMC PowerFlex: Secure Snapshots," Technical White Paper, Jul. 2020, 17 pages.

Dell Technologies, "Dell EMC PowerFlex: Protected Maintenance Mode," Technical White Paper, Jul. 2020, 20 pages.

Dell Technologies, "Dell EMC PowerFlex: Introduction to Replication," Technical White Paper, Jun. 2020, 34 pages.

Dell Technologies, "Dell EMC PowerFlex: Networking Best Practices and Design Considerations," Best Practices, Jun. 2020, 64 pages.

Dell EMC, "Getting To Know Dell EMC PowerFlex," Version 3.5.x, Rev. 02, Jan. 2021, 66 pages.

Dell, "PowerVault MD3 SSD Cache Overview," White Paper, 2012, 22 pages.

U.S. Appl. No. 16/918,654 filed in the name of Rivka Matosevich et al. filed Jul. 1, 2020, and entitled "Sharing Memory Resources Between Asynchronous Replication Workloads."

U.S. Appl. No. 16/983,423 filed in the name of Dan Aharoni et al. filed Aug. 3, 2020, and entitled "Deferred Reclamation of Invalidated Entries that are Associated with a Transaction Log in a Log-Structured Array."

U.S. Appl. No. 17/065,754 filed in the name of Dan Aharoni et al. filed Oct. 8, 2020, and entitled "Direct Response to IO Request in Storage System with Remote Replication."

U.S. Appl. No. 17/070,073 filed in the name of Dan Aharoni et al. filed Oct. 14, 2020, and entitled "Direct Response to IO Request in Storage System Having an Intermediary Target Apparatus."

U.S. Appl. No. 17/070,288 filed in the name of Anurag Sharma et al. filed Oct. 14, 2020, and entitled "Pipeline-Based System for Configuration Checking and Reporting Associated with an Information Processing System."

U.S. Appl. No. 17/071,407 filed in the name of John Moran et al. filed Oct. 15, 2020, and entitled "Dynamic Remediation Actions in Response to Configuration Checks in an Information Processing System."

U.S. Appl. No. 17/077,105 filed in the name of Yosef Shatsky et al. filed Oct. 22, 2020, and entitled "Volume Tiering in Storage Systems."

U.S. Appl. No. 17/106,988 filed in the name of Rivka Matosevich et al. filed Nov. 30, 2020, and entitled "Managing Host Connectivity to a Data Storage System."

U.S. Appl. No. 17/123,525 filed in the name of Itay Keller et al. filed Dec. 16, 2020, and entitled "Deferred Reclamation of Invalidated Entries Associated with Replication in a Log-Structured Array."

U.S. Appl. No. 17/145,646 filed in the name of Yosef Shatsky et al. filed Jan. 11, 2021, and entitled "Redistribution of Processing Groups between Server Nodes Based on Hardware Resource Utilization."

U.S. Appl. No. 17/232,203 filed in the name of Roman Spiegelman filed Apr. 16, 2021, and entitled "Object Synchronization of Server Nodes in a Network Computing Environment."

U.S. Appl. No. 17/236,256 filed in the name of Doron Tai et al. filed Apr. 21, 2021, and entitled "Recovery from Partial Device Error in Data Storage System."

U.S. Appl. No. 17/306,601 filed in the name of Rivka Matosevich et al. filed May 3, 2021, and entitled "Managing Replication Journal in a Distributed Replication System."

U.S. Appl. No. 17/308,166 filed in the name of Adi Bar Shalom et al. filed May 5, 2021, and entitled "Journal Barrier Consistency Determination."

U.S. Appl. No. 17/351,733 filed in the name of Yosef Shatsky et al. filed Jun. 18, 2021, and entitled "Data Deduplication in a Disaggregated Storage System."

U.S. Appl. No. 17/361,666 filed in the name of Yosef Shatsky et al. filed Jun. 29, 2021, and entitled "Tracking Utilization of Data Blocks in a Storage System."

\* cited by examiner

400

410

UTILIZING A PERSISTENT WRITE CACHE AS A REDO LOG

TECHNICAL FIELD

This disclosure relates generally to data storage management techniques and, more particularly, to techniques for managing redo logs for recovery.

BACKGROUND

A storage system can implement a redo log to record changes to stored data as the changes occur due to, e.g., newly written data, updated data, etc. A redo log comprises a plurality of sequential redo entries or redo records, which store information regarding changes that are made to data of the storage system. Upon some failure of the storage system, the redo log is utilized to recover and reconstruct lost metadata. The sequentiality of the redo log ensures that the metadata will be reconstructed to the precise state of the metadata prior to the failure. While the sequential nature of the redo log provides an efficient method of recovering lost metadata, the sequentiality of the redo log can lead to increased latency due to the fact that the writes must be acknowledged in the order they are written to preserve the proper ordering of the log entries upon recovery. More specifically, in storage systems that can write in parallel, a sequential redo log may increase latency in instances where, e.g., a relatively small write operation is followed by a relatively large write operation. The large write operation takes a long time to complete and has long latency, while the small write operation is expected to have a low latency to complete. However, the small write operation is required to wait for the previous large write operation to complete and return an acknowledge message before the small write operation can return an acknowledge message.

SUMMARY

Exemplary embodiments of the disclosure include storage control systems which utilize persistent write caches for reduced write latency and as redo logs for recovery. For example, in an exemplary embodiment, a storage control system receives a first write request and a second write request following the first write request, wherein the first write request comprises a first data item to be written to a primary storage, and the second write request comprises a second data item to be written to the primary storage. The storage control system performs a first cache write operation to write the first data item to a persistent write cache, and a second cache write operation to write the second data item to the persistent write cache, wherein the first and second cache write operations are performed in parallel. The first cache write operation comprises a split write operation which comprises writing a parsing header for the first data item to the persistent write cache, and writing a payload of the first data item to the persistent write cache. The second cache write operation comprises storing the second data item and an associated metadata item in the persistent write cache, and waiting at least for an acknowledgment that the parsing header for the first data item has been successfully stored in the persistent write cache before returning an acknowledgment to a host that the second data item is successfully stored in the primary storage in response to the second data item and the associated metadata item being stored in the persistent write cache.

In another exemplary embodiment, the storage control system utilizes the persistent write cache as a cyclic redo log to recover and reconstruct metadata, which is lost as a result of a failure, by replaying entries of the persistent write cache, wherein replaying the entries comprises parsing the entries of the persistent write cache in a cyclic order using one or more of cached metadata items and cached parsing headers associated with the entries in the persistent write cache that were written using split write operations. A parsing header for a previous entry allows the storage control system to find a subsequently written entry in the redo log even if a payload of the previous entry is missing.

Other embodiments of the disclosure include, without limitation, methods and articles of manufacture comprising processor-readable storage media, which are configured to utilize persistent write caches for reduced write latency and as redo logs for recovery.

DETAILED DESCRIPTION

Exemplary embodiments of the disclosure will now be discussed in further detail with regard to systems and methods for implementing a write cache management system which is configured to utilize a persistent write cache for reduced write latency and as a redo log for recovery. For purposes of illustration, exemplary embodiments will be described herein with reference to exemplary network computing systems, such as distributed storage systems, which implement data processing systems and associated computers, servers, storage devices and other processing devices. It is to be appreciated, however, that these and other embodiments are not restricted to the particular illustrative system and device configurations shown. Accordingly, the term "network computing system" as used herein is intended to be broadly construed, so as to encompass, for example, processing systems comprising cloud computing and storage systems, as well as other types of processing systems comprising various combinations of physical and virtual processing resources. A network computing system may therefore comprise, for example, at least one data center or other cloud-based systems that include one or more cloud systems that host multiple tenants which share cloud resources. Numerous different types of enterprise computing and storage systems are also encompassed by the term "network computing system" as that term is broadly used herein.

Figure 1:
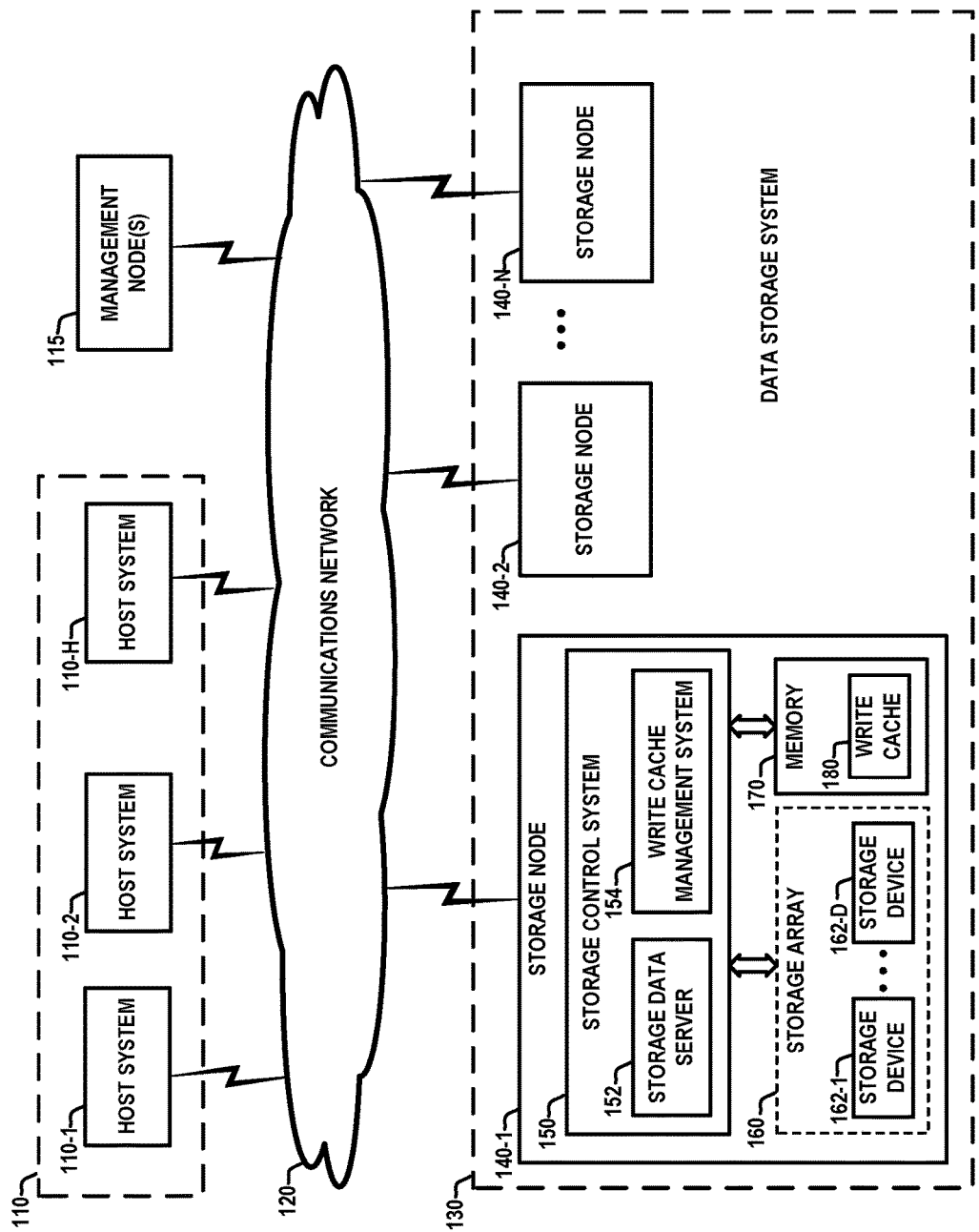
FIG. 1 schematically illustrates a computing system comprising a data storage system which is configured to utilize a persistent write cache as a redo log, according to an exemplary embodiment of the disclosure.

FIG. 1 schematically illustrates a network computing system comprising a data storage system which is configured to utilize a persistent write cache as a redo log, according to an exemplary embodiment of the disclosure. The network computing system 100 comprises one or more host systems 110-1, 110-2, . . . 110-H (collectively, host systems 110), one or more management nodes 115, a communications network 120, and a data storage system 130. The data storage system 130 comprises one or more storage nodes 140-1, 140-2, . . . , 140-N (collectively, storage nodes 140). As shown in FIG. 1, the storage node 140-1 comprises a storage control system 150, a storage array 160 comprising a plurality of storage devices 162-1, . . . , 162-D (collectively, storage devices 162), and primary memory 170 (alternatively, system memory 170). In some embodiments, the primary memory 170 comprises volatile random-access memory (RAM) and non-volatile RAM (NVRAM). In some embodiments, the other storage nodes 140-2 . . . 140-N have the same or similar configuration as the storage node 140-1 shown in FIG. 1. The storage control system 150 comprises a storage data server 152, and write cache management system 154 which is configured to provision and manage a write cache 180 which is utilized as a redo log that is persisted in the primary memory 170, the functions of which will be described in further detail below.

In general, the management nodes 115 implement application programming interfaces (APIs) to enable manual, automated, and/or semi-automated configuration, management, provisioning, and monitoring of the data storage system 130 and the associated storage nodes 140. In some embodiments, the management nodes 115 comprise standalone dedicated management server nodes, which may comprise physical and/or virtual server nodes.

The host systems 110 comprise physical server nodes and/or virtual server nodes which host and execute applications that are configured to process data and execute tasks/workloads and perform computational work, either individually, or in a distributed manner, to thereby provide compute services to one or more users (the term "user" herein is intended to be broadly construed so as to encompass numerous arrangements of human, hardware, software or firmware entities, as well as combinations of such entities). In some embodiments, the host systems 110 comprise application servers, database servers, etc. In some embodiments, the host systems 110 include virtual nodes such as virtual machines and container systems. In some embodiments, the host systems 110 comprise a cluster of computing nodes of an enterprise computing system, a cloud-based computing system, or other types of computing systems or information processing systems comprising multiple computing nodes associated with respective users. The host systems 110 issue data access requests to the data storage system 130, wherein the data access requests include (i) write requests to store data in the storage arrays 160 of the storage nodes 140 and (ii) read requests to access data that is stored in storage arrays 160 of the storage nodes 140.

The communications network 120 is configured to enable communication between the host systems 110 and the storage nodes 140, and between the management nodes 115, the host systems 110, and the storage nodes 140, as well as to enable peer-to-peer communication between the storage nodes 140 of the data storage system 130. In this regard, while the communications network 120 is generically depicted in FIG. 1, it is to be understood that the communications network 120 may comprise any known communications network such as, a global computer network (e.g., the Internet), a wide area network (WAN), a local area network (LAN), an intranet, a satellite network, a telephone or cable network, a cellular network, a wireless network such as Wi-Fi or WiMAX, a storage fabric (e.g., IP-based or Fiber Channel storage fabric), or various portions or combinations of these and other types of networks. In this regard, the term "network" as used herein is therefore intended to be broadly construed so as to encompass a wide variety of different network arrangements, including combinations of multiple networks possibly of different types, which enable communication using, e.g., Transfer Control Protocol/Internet Protocol (TCP/IP) or other communication protocols such as Fibre Channel (FC), FC over Ethernet (FCoE), Internet Small Computer System Interface (iSCSI), Peripheral Component Interconnect express (PCIe), InfiniBand, Gigabit Ethernet, etc., to implement input/output (I/O) channels and support storage network connectivity. Numerous alternative networking arrangements are possible in a given embodiment, as will be appreciated by those skilled in the art.

The data storage system 130 may comprise any type of data storage system, or combination of data storage systems, including, but not limited to, a storage area network (SAN) system, a network-attached storage (NAS) system, a direct-attached storage (DAS) system, dynamic scale-out data storage systems, or other types of distributed data storage systems comprising software-defined storage, clustered or distributed virtual and/or physical infrastructure. The term "data storage system" as used herein should be broadly construed and not viewed as being limited to storage systems of any particular type or types. It is to be noted that each storage node 140 and its associated storage array 160 is an example of what is more generally referred to herein as a "storage system" or a "storage array." The storage nodes 140 can be physical nodes, virtual nodes, and a combination of physical and virtual nodes.

In some embodiments, the storage nodes 140 comprise storage server nodes (e.g., server node 600, shown in FIG. 6) which comprise processors and system memory, and host virtual machines and/or containers, although numerous other configurations are possible. In some embodiments, one or more of the storage nodes 140 can additionally implement functionality of a compute node, and vice-versa, wherein a compute node is configured to process data and execute tasks/workloads and perform computational work, either individually, or in a distributed manner, to thereby provide compute services such as execution of one or more applications on behalf of one or more users. In this regard, the term "storage node" as used herein is therefore intended to be broadly construed, and a storage system in some embodiments can be implemented using a combination of storage nodes and compute nodes.

In some embodiments, each storage node 140 comprises a server node that is implemented on, e.g., a physical server machine or storage appliance comprising hardware processors, system memory, and other hardware resources that execute software and firmware to implement the functionalities and data management services of the storage node 140 and the storage control system 150, as discussed herein. More specifically, in some embodiments, each storage node 140 comprises a plurality of storage control processors which execute a lightweight operating system (e.g., a customized lightweight Linux kernel) and functional software (e.g., software-defined storage software) to implement various functions of the storage node 140 and the storage control system 150, wherein such functions include, but are not limited to, (i) managing and executing data access requests issued by the host systems 110, (ii) performing various data management and storage services, and (iii) controlling network communication and connectivity with the host systems 110 and between the storage nodes 140 within the data storage system 130, etc.

In a distributed storage environment, the storage control systems 150 of the storage nodes 140 are configured to communicate in a cooperative manner to perform functions such as e.g., processing data access requests received from the host systems 110, aggregating/pooling the storage capacity of storage arrays 160 of the storage nodes 140, performing functions such as inline data compression/decompression, data deduplication, thin provisioning, and data protection functions such as data replication, snapshot, and data protection and resiliency schemes based on data striping and/or parity (e.g., erasure coding, RAID, etc.), and other types of data management functions, depending on the system configuration.

The storage devices 162 comprise one or more of various types of storage devices such as hard-disk drives (HDDs), solid-state drives (SSDs), Flash memory cards, or other types of non-volatile memory (NVM) devices including, but not limited to, non-volatile random-access memory (NVRAM), phase-change RAM (PC-RAM), magnetic RAM (MRAM), etc. In some embodiments, the storage devices 162 comprise flash memory devices such as NAND flash memory, NOR flash memory, etc. The NAND flash memory can include single-level cell (SLC) devices, multi-level cell (MLC) devices, triple-level cell (TLC) devices, or quad-level cell (QLC) devices. These and various combinations of multiple different types of storage devices may be implemented in the data storage system 130. In this regard, the term "storage device" as used herein should be broadly construed to encompass all types of persistent storage media including hybrid drives.

In some embodiments, the storage array 160 of a given storage node 140 comprises DAS resources (internal and/or external), wherein the storage control system 150 of the given storage node 140 is configured to directly access the storage array 160 of the given storage node 140. In some embodiments, the data storage system 130 comprises a disaggregated data storage system in which storage data processing is separate from data storage. More specifically, in an exemplary embodiment of a disaggregated storage system, the storage control systems 150 comprise storage control nodes, and the storage arrays 160 comprises storage nodes, which are separate from the storage control nodes. In such a configuration, the storage control systems 150 are configured to handle the processing of data associated with data access requests (i.e., I/O read and write requests), and the storage arrays 160 are configured to handle writing/reading data to/from respective storage devices 162. In a disaggregated architecture, each storage control system 150 would be configured to directly access data stored in each storage array 160 in the data storage system 130. The disaggregated storage system architecture essentially separates the storage control compute layers (e.g., storage control systems 150) from the data storage layers (e.g., storage arrays 160).

In a disaggregated data storage system, each storage array 160 is implemented as, e.g., an external DAS device, wherein each storage control system 150 of each storage node 140-1, 140-2, . . . , 140-N is connected to each storage array 160 using any suitable interface protocol such as Small Computer Systems Interface (SCSI), Fibre Channel (FC), etc. In other embodiments, the storage control systems 150 of each storage node 140-1, 140-2, . . . , 140-N can be network-connected to each of the storage arrays 160 (via a high-performance network fabric) using any suitable network configuration and network interface protocol such as Ethernet, FC, Internet Small Computer Systems Interface (iSCSI), InfiniBand, etc. For example, in some embodiments, the storage control systems 150 and the storage arrays 160 are interconnected in a full-mesh network, wherein back-end interconnectivity is achieved using, e.g., a redundant high-speed storage fabric, wherein the storage control systems 150 can utilize remote procedure calls (RPC) for control messages and remote direct memory access (RDMA) for accessing data blocks.

In some embodiments, the storage data servers 152 of the storage nodes 140 are configured to consolidate the capacity of the storage arrays 160 (e.g., HDDs, SSDs, PCIe or NVMe flash cards, etc.) of the storage nodes 140 into storage pools from which logical volumes are allocated, wherein the logical volumes (e.g., a block unit of storage management) are identified by, e.g., logical unit numbers (LUNs). More specifically, the storage data servers 152 of the storage nodes 140 are configured to create and manage storage pools (e.g., virtual pools of block storage) by aggregating storage capacity of the storage arrays 160 of the storage nodes 140 and dividing a given storage pool into one or more volumes, wherein the volumes are exposed to the host systems 110 as block devices. For example, a virtual block device can correspond to a volume of a storage pool. Each virtual block device comprises any number of actual physical storage devices, wherein each block device is preferably homogenous in terms of the type of storage devices that make up the block device (e.g., a block device can include only HDD devices or SSD devices, etc.).

In some embodiments, each host system 110 comprises a storage data client (SDC) which executes on the host system and which consumes the block storage exposed by the storage data servers 152. In particular, an SDC comprises a lightweight block device driver that is deployed on a given host system 110 to expose shared block volumes to the given host system 110. The SDC exposes the storage volumes as block devices to each application (e.g., virtual machine, container, etc.) that execute on the same server (e.g., host system 110) on which the SDC is installed. The SDC of a given host system 110 exposes block devices representing the virtual storage volumes that are currently mapped to the given host system 110. The SDC for a given host system 110 serves as a block driver for the host system 110, wherein the SDC intercepts I/O requests, and utilizes the intercepted I/O request to access the block storage that is managed by the storage data servers 152. The SDC provides the operating system or hypervisor (which runs the SDC) access to the logical block devices (e.g., volumes). Each SDC has knowledge of which storage data servers 152 hold (e.g., own) their block data, so multipathing can be accomplished natively through the SDCs.

As noted above, the management nodes 115 in FIG. 1 implement a management layer which manages and configures the network computing system 100. In some embodiments, the management nodes 115 comprise a tightly-coupled cluster of manager nodes that are configured to supervise the operations of the storage cluster and manage storage cluster configurations. For example, management nodes 115 include metadata manager (MDM) modules that operate outside of the data path and provide the relevant information to the SDCs and the storage data servers 152 to allow such components to control data path operations. The MDM modules are configured to manage the mapping of SDCs to the storage data servers 152 of the storage nodes 140. The MDM modules manage various types of metadata that are required to perform various management operations in the storage environment such as, e.g., managing configuration changes, managing the SDCs and storage data servers 152, maintaining and updating device mappings, maintaining management metadata for controlling data protection operations such as snapshots, replication, RAID configurations, etc., managing system capacity including device allocations and/or release of capacity, performing operation for recovery from errors and failures, and system rebuild tasks including rebalancing, etc.

In some embodiments, as noted above, the primary memory 170 comprises volatile RAM such as dynamic RAM (DRAM), synchronous DRAM (SDRAM), etc. In addition, the primary memory 170 comprises non-volatile memory which is configured as RAM. In this regard, in some embodiments, the primary memory 170 comprises a storage class memory (SCM) tier which extends the RAM that is available to the operating system of the storage node 140. The SCM tier can be implemented with various types of non-volatile memory media hardware such as persistent memory (PMEM) modules, solid-state drive (SSD) devices, nonvolatile dual in-line memory modules (NVDIMMs), and other types of persistent memory modules with a DRAM form factor, etc. In addition, persistent memory may be implemented using a vaulting RAM system which comprises a battery-backed RAM in which data is stored to vault devices upon device or power failure. In general, the non-volatile memory devices can be accessed over a memory bus (implemented via, e.g., Peripheral Component Interconnect Express (PCIe)) using a suitable interface such as non-volatile memory express (NVMe).

In some embodiments, the write cache management system 154 is configured to provision and manage the persistent write cache 180, which is stored the primary memory 170, or in a storage device of the storage array 160 in the event that the primary memory 170 of the storage node 140 does not include non-volatile memory. The persistent write cache 180 is utilized for several purposes. For example, the storage control system 150 utilizes the persistent write cache 180 to temporarily store I/O write data (and associated metadata) of I/O write requests with minimal delay, which allows the storage control system 150 to return an acknowledgement to a user with low latency after the I/O write data is stored in the write cache 180. In addition, the persistent write cache 180 is utilized as a redo log for purposes of data recovery in the event of a failure. During operation, new entries are sequentially written to the persistent write cache 180, wherein each entry comprises a block of data and associated metadata. Upon a failure, the persistent write cache 180 is read as a redo log and lost metadata is recovered and reconstructed from the write cache 180. The sequentiality of the persistent write cache 180 ensures that the metadata will be reconstructed to the precise state the metadata was in prior to the failure. After accumulating a sufficient amount of content (e.g., data items, and metadata items), some or all of the content of the write cache 180 is destaged and persisted in primary storage and primary metadata structures, after which the write cache 180 no longer serves as redo log for the destaged metadata items. Exemplary systems and methods for write cache management according to embodiments of the disclosure will now be discussed in further detail in conjunction with FIGS. 2-5.

Figure 2:
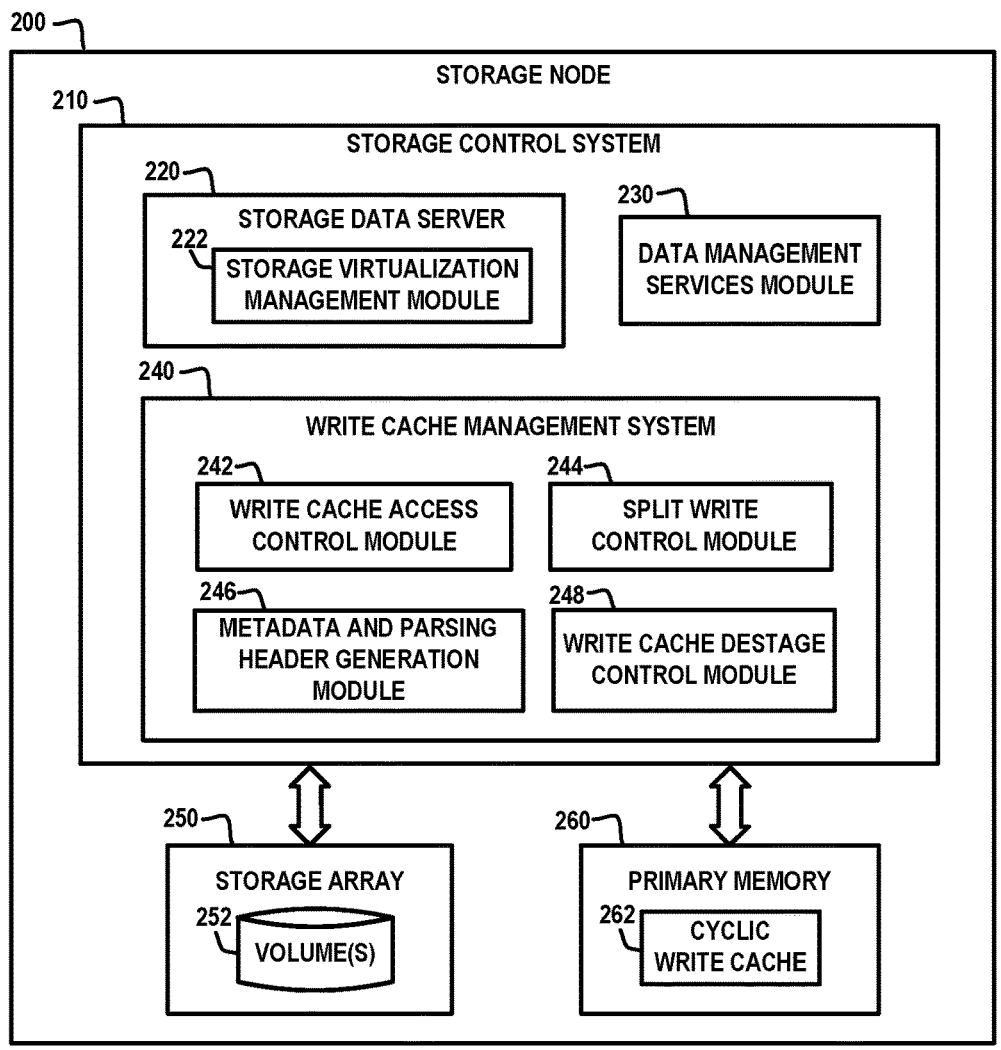
FIG. 2 schematically illustrates a storage node which comprises a write cache management system that is configured to provision and manage a persistent write cache which is utilized as a redo log, according to an exemplary embodiment of the disclosure.

FIG. 2 schematically illustrates a storage node which comprises a write cache management system that is configured to provision and manage a persistent write cache which is utilized as a redo log, according to an exemplary embodiment of the disclosure. In some embodiments, FIG. 2 schematically illustrates an exemplary architecture of the storage nodes 140 of the data storage system 130 of FIG. 1. As shown in FIG. 2, the storage node 200 comprises a storage control system 210 which implements a storage data server 220, a data management services module 230, and a write cache management system 240. The storage data server 220 comprises a storage virtualization management module 222. The write cache management system 240 comprises various modules including, but not limited to, a write cache access control module 242, a split write control module 244, a metadata and parsing header generation module 246, and a write cache destage control module 248, the functions of which will be described in further detail below.

The storage node 200 further comprises a storage array 250 (comprising storage devices), and primary memory 260. The storage array 250 comprises storage capacity which is partitioned into one or more storage volumes 252. The primary memory 260 comprises a cyclic write cache 262 which is provisioned in the primary memory 260 and managed by the write cache management system 240. The cyclic write cache 262 serves as (i) a persistent write cache for reduced write latency, and (ii) a redo log for recovery. In some embodiments, the cyclic write cache 262 resides in a region of non-volatile RAM (e.g., PMEM memory, SSD memory, etc.), which is allocated for the cyclic write cache 262. In other embodiments, the cyclic write cache 262 resides in an allocated region of storage in the storage array 250.

The storage data server 220 implements functions as discussed above such as processing I/O write and read requests received from host systems to write/read data to/from the storage array 250. The storage virtualization management module 222 implements any suitable logical volume management system which is configured to create and manage the storage volume(s) 252 by aggregating the capacity of the storage array 250 into one or more virtual storage pools that are thin-provisioned for maximum capacity, and logically dividing each storage pool into one or more storage volumes that are exposed as block devices (e.g., LUNs) to the applications or host systems 110 (FIG. 1) which consume the data.

The data management services module 230 implements one or more types of data management services including, but not limited to, inline data compression/decompression, thin provisioning, and data protection functions such as data replication, data backup, data snapshot, and data protection and resiliency schemes based on data striping and/or parity (e.g., erasure coding, RAID, etc.), and other types of data management functions, depending on the system configuration. In embodiments where the storage data server 220 abstracts the physical media (e.g., storage array 250) and presents logical (virtualized) addresses to users in the form of LUNs, the storage data server 220 generates and manages metadata to provide mapping between logical addresses and physical addresses. In addition, the storage control system 210 generates and manages metadata which is utilized for managing snapshots, change tracking for remote replication, managing deduplication pointers, managing data compression, resiliency related metadata (e.g., RAID), etc.

The various modules of the write cache management system 240 collectively implement methods that are configured to provision and manage the cyclic write cache 262. For example, the write cache access control module 242 implements methods to store data items and associated metadata items in the cyclic write cache 262 according to a data placement scheme, as discussed in further detail below. In addition, the write cache access control module 242 is configured to return an acknowledgment message to a calling application or host system after the I/O write data is written into the cyclic write cache 262. In addition, the write cache access control module 242 is configured to read items from the cyclic write cache 262 for purposes of (i) servicing I/O read requests for data that is persisted in the cyclic write cache 262, but not yet written to primary storage, and (ii) reading the cyclic write cache 262 when it is utilized as a redo log to recover lost metadata.

The split write control module 244 is configured to perform split write operations for relatively large data items into two cache write operations including (i) a first cache write operation to write a parsing header for a data item to the cyclic write cache 262, and (ii) a second cache write operation to write a data payload of the data item to the cyclic write cache 262. Logically, the cache write operations for the parsing header and the data payload for a given data item are separate write operations that are separately validated. The implementation of split write operations for large data items serves to reduce write latency and optimize the use of the write cache as a redo log because when a split write operation is performed for a given data item, a cache write for a next data item can return an acknowledge message (ACK) when the parsing header of the previous data item is written to the cyclic write cache 262. When a parsing header for a given large data item is successfully written to the cyclic write cache 262, in the event of a failure, the parsing header enables recovery of metadata associated with one or more subsequent writes to the write cache which have been acknowledged, even if the data payload of the given large data item was not successfully stored as a result of the failure. Exemplary modes of operation of the split write control module 244 will be discussed in further detail below in conjunction with, e.g., FIGS. 4B and 5.

The metadata and parsing header generation module 246 implements methods that are configured to generate metadata items, and parsing headers are associated with data items to be stored in the write cache. The metadata includes information which is used to track the location of the cached data items, and any other relevant information that may be associated with the data items to implement the cache management functions as discussed herein. In some embodiments, a parsing header for a given data item contains information that allows the write cache management system 240 to continue parsing the next entries in the write cache when utilizing the write cache as a redo log to recover and reconstruct lost metadata.

The write cache destage control module 248 implements methods that are configured to control the destaging of data items and metadata items from the write cache. The write cache destage control module 248 implements write cache eviction/destaging operations which take into consideration that the cyclic write cache 262 comprises both data items and associated metadata items, which are separate entities that are destaged and persisted in different primary data structures. In some embodiments, the write cache destaging operations are configured to destage data items and destage metadata items separately, based on associated eviction/destaging policies, the details of which are implementation specific and are outside the scope of this disclosure. For example, in some embodiments, the write cache management system 240 can perform a metadata destage operation to destage and persist a plurality of metadata items in the cyclic write cache 262 so that the amount of metadata in the write cache does not exceed some predetermined threshold number. Further, in some embodiments, the write cache management system 240 can monitor the amount of used and/or remaining capacity of the write cache to determine if the write cache is nearing a maximum capacity, and then destage data items to ensure that the write cache does not become full.

Figure 3:
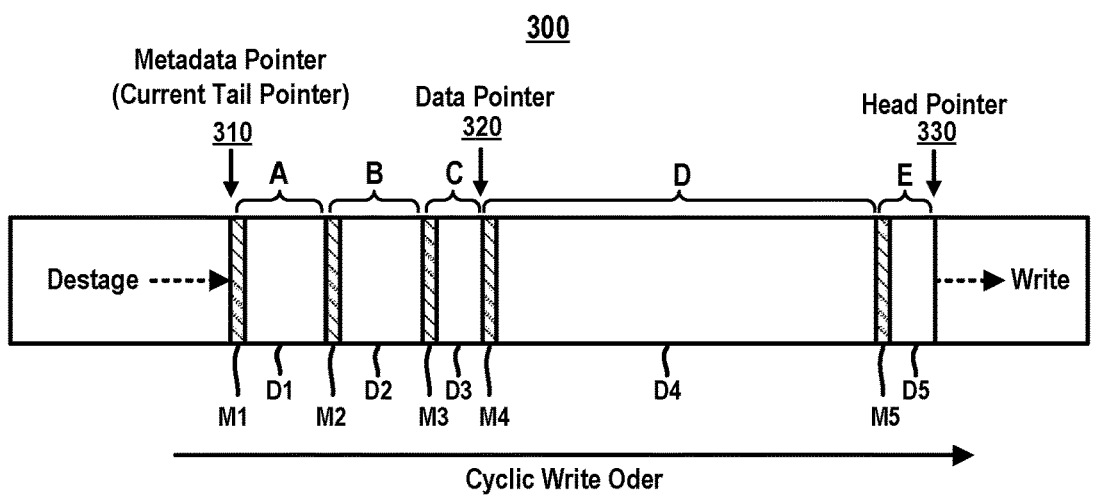
FIG. 3 schematically illustrates a framework of a persistent write cache which is utilized as a redo log, according to an exemplary embodiment of the disclosure.

FIG. 3 schematically illustrates a persistent write cache which is utilized as a redo log, according to an exemplary embodiment of the disclosure. In particular, FIG. 3 schematically illustrates a persistent write cache 300 which is implemented as cyclic, contiguous buffer, wherein items (e.g., data items and metadata items) are always written to a head location of the persistent write cache 300, and items are destaged from a tail location of the persistent write cache 300 (alternatively, cyclic write cache 300). With this scheme, the items in the persistent write cache 300 are arranged in a cyclic write order from the tail location of the persistent write cache 300 to the head location of the persistent write cache 300.

For purposes of illustration, FIG. 3, shows a state in which the persistent write cache 300 comprises a plurality of entries A, B, C, D and E, which represent a sequence of writes to the persistent write cache 300. Each entry A, B, C, D and E comprises a respective data item D1, D2, D3, D4, and D5, and corresponding metadata item M1, M2, M3, M4, and M5. In some embodiments, the data and associated metadata items in the persistent write cache 300 are written using out-of-place writes based on an order in which the associated host/user I/O write requests are received by the storage control system 210. For example, the data items D1 and D4 can represent a block of data that is associated with a given offset location in a storage volume, but wherein the data item D4 and associated metadata item M4 represent an updated/modified version of a data block associated with data item D1 and associated metadata item M1.

In some embodiments, the persistent write cache 300 has a configurable predefined size, which can be adjusted as needed. In some embodiments, the persistent write cache 300 comprises a size on the order of gigabytes per storage node. In some embodiments, the persistent write cache 300 is organized into fixed-size addressable units (e.g., allocation units) with a predefined block size, e.g., 512 bytes, to thereby allow the persistent write cache 300 to support block media. In this regard, each data item D1, D2, D3, D4, and D5 comprises one or more blocks of data of the predefined block size, e.g., a given data item can have block size of 512 bytes, or multiples of 512 bytes (e.g., 1,024 bytes, 2,048 bytes, 4,096 bytes, 8,192 bytes, 16,384 bytes, etc.) before data compression (if implemented). Each metadata item M1, M2, M3, M4, and M5 comprises a block of metadata associated with the data items D1, D2, D3, D4, and D5.

The write cache management system 240 implements methods that are configured to manage a set of pointers that are used in conjunction with the cyclic persistent write cache 300 to (i) determine a tail location and a head location of the write cache 300, (ii) determine a location (e.g., metadata item) in the write cache 300 from where a recovery process begins, and to (iii) determine which data items have been destaged from the write cache 300 and persisted to storage.

For example, in some embodiments, as shown in FIG. 3, the write cache 300 is managed using a plurality of pointers including a metadata pointer 310, a data pointer 320, and a head pointer 330. In some embodiments, the cyclic write cache 300 does not implement a separate tail pointer, but rather the tail location of the cyclic write cache 300 is determined as the minimum of the metadata pointer 310 and the data pointer 320.

The head pointer 330 points to the head location of the cyclic write cache 300. The metadata pointer 310 points to a location of a first metadata item (e.g., metadata item M1), in the cyclic order from the tail location to the head location of the cyclic write cache 300, which has not been destaged and persisted in a primary metadata structure as part of a metadata destage operation. For purposes of recovery where the persistent write cache 300 is utilized as a cyclic redo log, the metadata pointer 310 points to a location in the write cache 300 from where a recovery process begins (as well as were a new metadata destage operation begins).

The data pointer 320 points to a location following a last data item which has been persisted to primary storage are part of a data destage process. For example, in the exemplary embodiment of FIG. 3, the data pointer 320 points to the end location of D3, which indicates that the data item D3, and other data items (e.g., D1 and D2) located before D3, have been destaged and persisted to primary storage. As noted above, the metadata pointer 310 and the data pointer 320 are used to determine a current tail location of write cache 300, which is the minimum of the data pointer 320 and the metadata pointer 310. For example, in the exemplary embodiment of FIG. 3, the metadata pointer 310 is located before the data pointer 320 in the cyclic write order of the write cache 300 and, thus, the metadata pointer 310 represents a current tail location of the cyclic write cache 300 at the point-in-time shown in FIG. 3.

The write cache 300 is managed based, in part, on the cyclic property of the write cache, wherein new entries (e.g., data items and metadata items) are always added to the head of the write cache 300 (as determined by the head pointer 330), and items are always destaged from the tail of the write cache 300, in order (wherein, as noted above, the tail is determined based on a minimum of the metadata pointer 310, and the data pointer 320). The implementation of the cyclic write cache 300 provides reduced overhead for handling data and associated metadata. In particular, the use of the cyclic write cache 300 provides reduced write overhead by storing data and associated metadata together in the cyclic write cache 300 without the need to initially persist the metadata in a separate persistent data structure.

In addition, sequential nature of the cyclic write cache 300 allows recovery of the content of the cyclic write cache 300 (via a recovery process) by sequentially parsing the cyclic write cache 300, starting from the tail location of the cyclic write cache 300. As noted above, the metadata pointer 310 points to a location in the cyclic write cache 300 from where a recovery process or a new metadata destage/checkpoint operation begins, and the data pointer 320 points to a location which indicates what data items have already been destaged and persisted to storage. All metadata items in the cyclic write cache 300, which have not been persisted to a primary metadata structure (e.g., metadata checkpoint) need to be read and replayed after a failure. The recovery process involves reading the cyclic write cache 300, parsing it, and replaying the items one at a time to reconstruct lost RAM metadata.

During operation, the write cache management system 240 writes data items and metadata items to the cyclic write cache 300. The cyclic write cache 300 persists the data with a minimal delay which allows the system to return an acknowledgement to the user with low latency. Since writes to the cyclic write cache 300 are acknowledged to the host system, the cyclic write cache 300 must also be capable of serving reads. To serve reads, the data in the cyclic write cache 300 must have lookup capabilities. In some embodiments, the write cache is optimized for writes and not for random read access and, therefore, the metadata in the write cache is not random access. In some embodiments, a write cache lookup data structure is implemented in volatile RAM, or in NVM.

The sequential nature of the cyclic write cache 300 utilized as a redo log provides an efficient method of recovering lost metadata in the event of failure. While the entries A, B, C, D, and E as shown in FIG. 3 can be concurrently written in parallel to multiple consecutive locations in the cyclic write cache 300, the writes for entries A, B, C, D, and E must be acknowledged in the offset order that such entries are written to the persistent write cache 300 to thereby preserve the ordering upon recovery. In this regard, there can be some undesired latency in writing to the cyclic write cache 300 in instances where there is a relatively large write large followed by one or more small writes. The large write can take a long time to complete and has long latency. On the other hand, the small write can take a short time to complete and is expected to have low latency. However, to preserve the orders of the writes, the small write would have to wait for the previous large write to complete and return an ACK message before the small write can return an ACK message, thus effectively increasing the latency of the small write. Exemplary embodiments of the disclosure provide techniques to overcome this latency issue.

Figure 4A:
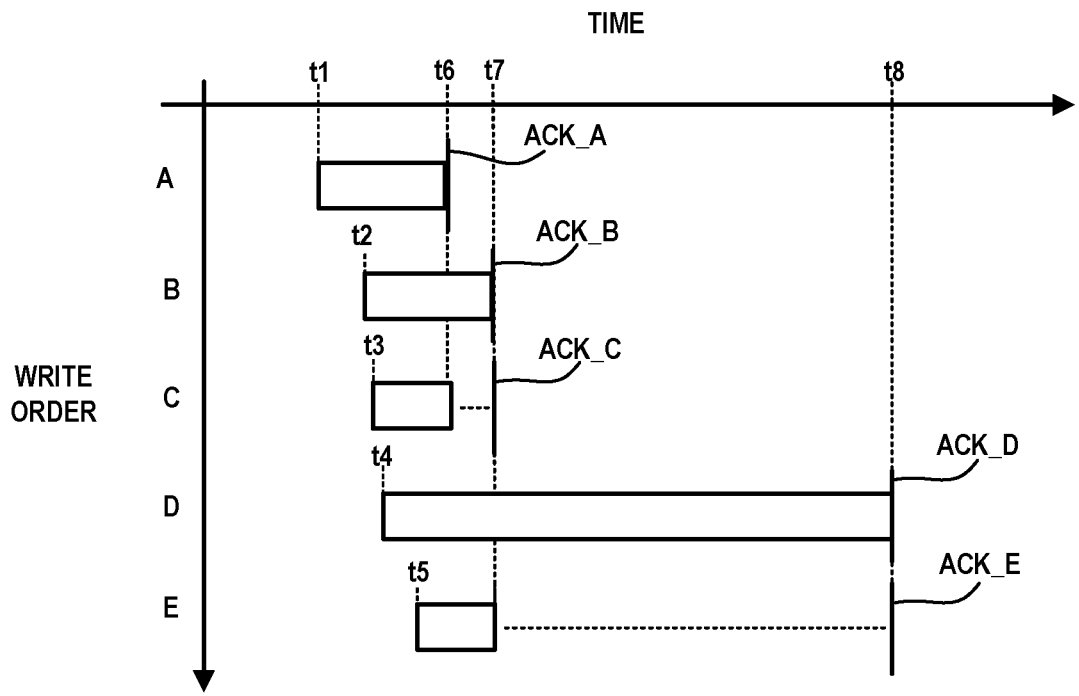
FIGS. 4A and 4B schematically illustrate a method for reducing latency in write operations when utilizing a persistent write cache as a redo log, according to an exemplary embodiment of the disclosure.
Figure 4B:
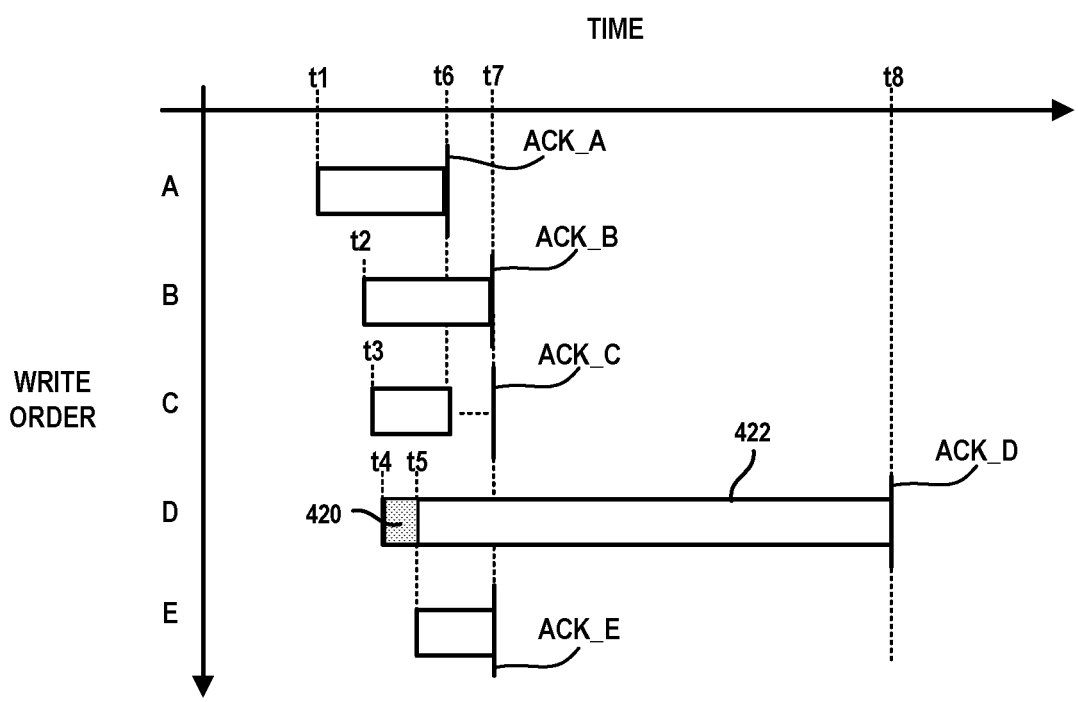

For example, FIGS. 4A and 4B schematically illustrate a method for reducing latency in write operations when utilizing a persistent write cache as a redo log, according to an exemplary embodiment of the disclosure. FIG. 4A schematically illustrates the problem associated with an undesired increase in the latency of a small write (e.g., write E) which occurs when the small write must wait for completion of a previous large write (e.g., write D), and FIG. 4B schematically illustrates a method of performing a split write operation for relatively large writes to reduce the latency of write operations for one or more small writes that follow the large write, according to an exemplary embodiment of the disclosure. In particular, in the context of the exemplary embodiment of FIG. 3, FIG. 4A depicts a timing diagram 400 which shows write operations for writing the entries A, B, C, D, and E into the cyclic write cache 300 over time, wherein it is assumed that the entries are received and written to the cyclic write cache 300 in the order of A, B, C, D, and E starting at times t1, t2, t3, t4, and t5, respectively. In addition, FIG. 4A schematically illustrates an exemplary state of operation in which the entries A, B, C, D, and E are concurrently written (in parallel) to the cyclic write cache 300.

As shown in FIG. 4A, the cache write operation for entry A is complete and returns an acknowledge message ACK_A at time t6. The cache write operation for entry B is complete and returns an acknowledge message ACK_B at time t7. The cache write operation for entry C is complete at time t6, but returns an acknowledge message ACK_C at time t7 after the cache write operation for the previous entry B is completed and acknowledged. In this regard, there is some minimal latency between the time t6 when entry C is fully written to the write cache 300 and the time t7 when the cache write operation for entry C is acknowledged.

Further, FIG. 4A schematically illustrates that the entry D is relatively large (e.g., 1 Mb or larger) and that the entry E is relatively small (e.g., 4 KB). In this regard, the cache write operation for the entry D has a relatively long latency and is complete and returns an acknowledge message ACK_D at time t8. Although the cache write operation for the entry E completes at time t7, an acknowledge message ACK_E is returned at time t8 after the cache write operation for the previous large entry D is completed and acknowledged. In this exemplary scenario, the acknowledge message ACK_E for the cache write operation of entry E is significantly delayed as a result of the relatively long latency associated with waiting for the completion of the previous cache write operation for the entry D.

The delay in returning the acknowledge message ACK_E for the cache write operation for entry E is needed to avoid the following scenario. Assume that the acknowledge message ACK_E was returned at time t7 when the cache write operation for entry E was completed, but before the cache write operation for entry D was completed at time t8. Assume further that a failure occurs between times t7 and t8, resulting in entry D not being successfully written to the cyclic write cache 300. In this scenario, when the cyclic write cache 300 is utilized and read as a redo log for purposes of recovery, the entry E will not be detected in the redo log because the entry D was not successfully written to the write cache 300. This results in data loss with regard to entry E because a parsing operation that is performed using the write cache 300 as a redo log will not detect the existence of the entry E due to a break in the parsing chain which results from the unsuccessful cache write operation for entry D due to the failure which occurs after time t7, notwithstanding that the cache write operation for the entry E was completed and acknowledge at time t7.

FIG. 4B depicts a timing diagram 410 which is similar to the timing diagram 400 of FIG. 4A, but FIG. 4B schematically illustrates a method of performing a split write operation for the relatively large entry D to reduce the latency of the cache write operation for the smaller entry E. In particular, as shown in FIG. 4B, the write operation for the entry D is split into two separate cache write operations including (i) a first cache write operation to store a parsing header 420 associated with the entry D, and (ii) a second cache write operation to store a data payload 422 associated with the entry D. With the split write operation for entry D, the next write operation for entry E is allowed to return the acknowledge message ACK_E when the parsing header 420 for the previous entry D is successfully written to the write cache 300. In particular, in the exemplary scenario shown in FIG. 4B, the cache write operation for the entry E can return the acknowledge message ACK_E at time t7 with no delay because all the previous cache write operations for the entries A, B, D, and D are either acknowledged or have successfully stored an associated parsing header.

In some embodiments, as noted above, a parsing header for a given entry will contain information that allows the write cache management system 240 to continue parsing next entries that are stored in the write cache 300 when utilizing the write cache 300 as a redo log to recover and reconstruct lost metadata. For example, in some embodiments, a parsing header will contain information including, but not limited to, (i) a header ID, (ii) a size of the associated entry, (iii) validity information regarding the associated entry, (iv) a checksum for the parsing header and a checksum for the data payload, (v) a pointer to next sequential entry written in the write cache 300, etc. In this regard, the parsing header comprises a minimal amount of information that is needed to know the size and validity of the given entry, and a location of a next subsequent entry in the write cache. In some embodiments, additional metadata information, such as a volume ID and volume offset for the given data item, will be stored along with the data payload during the split write operation. In some embodiments, the parsing header (which is generated for a given data item for a split write operation) comprises all metadata information that would be contained in given metadata item that is associated with a given data item, such that no additional metadata information would be included in the data payload.

In the exemplary embodiment shown in FIG. 4B, when the parsing header 420 for the large entry D is successfully written to the write cache 300, in the event of a failure after time t7 when the cache write operation for the entry E is completed and acknowledged, the parsing header 420 enables recovery of the metadata associated with the cache write operation for entry E in the write cache 300, even if the data payload 422 of the entry D is not successfully stored as a result of the failure. During a recovery process in which the write cache 300 is utilized as a redo log to recover and reconstruct lost metadata by reading the sequential entries, the entry D with only a valid parsing header 420 will not be processed, but the information in the parsing header 420 will be used to identify the next entry (e.g., entry E) in the write cache 300 so that the parsing can continue and avoid data loss of the entries that were completed and acknowledged subsequent to the successful write of the parsing header 420.

During the recovery process, as the redo log is read, the write cache management system can determine the validity of the parsing header 420 for the entry D using the checksum of the parsing header 420, and determine the validity of the data payload 422 using the checksum for the data payload 422. If some or all of the data payload 422 was not successfully stored before the failure, the previously computed checksum for the data payload 422 (as stored with the parsing header 420) will not match a current checksum computed for the incomplete data payload of the entry D in the write cache 300. Again, even if the data payload 422 for the entry D is not written, the valid parsing header 420 will contain the information needed to continue parsing the next entries.

In some embodiments, a split write operation is performed for large data items which have a size that exceeds a specified size threshold. The size threshold will vary depending on the implementation of the storage system (e.g., the allocation unit size of the storage). For example, in some embodiments, the size threshold can be specified as: $2^n \times$ allocation unit size, where $n=(1, 2, 3, 4, \ldots)$. The specified size threshold is selected to balance the latency associated with a completed cache write operation waiting to send an acknowledge message until a previous cache write operation is completed and acknowledged, against the latency and overhead associated with performing a split write operation (which requires two separate write operations, generation of a separate parsing header, and computation of a checksum for the parsing header, etc.). For example, as shown in FIG. 4B, there in some latency between the time t6 the cache write operation for entry C is complete and the time t7 when the acknowledge message ACK_C is returned, after the cache write operation for the previous entry B is completed and acknowledged. However, such minimal delay can be acceptable in instances where the given entry B is relatively small, and the latency associated with generating and storing a parsing header for the relatively small entry B is comparable to the latency associated with the cache write operation for entry C waiting to send the acknowledge message ACK_C upon completion of the single write operation for the previous entry B.

It is to be noted that a split write operation can be utilized in instances where there is no dependency between the write operations for the entries D and E. If the entries D and E are overlapping writes (writes to the same location), then the cache write operation for the entry E must wait for completion of the write cache operation for the entry D. The reason for this is that the redo log will play the order of A, B, C, D, E, whereas the original order prior to the failure was A, B, C, E, D. This is not a problem when the entries D and E are independent. Fortunately, this has no practical impact on performance because overlapping writes are typically avoided by applications, since storage standards do not guarantee any particular outcome for parallel overlapping writes.

Figure 5:
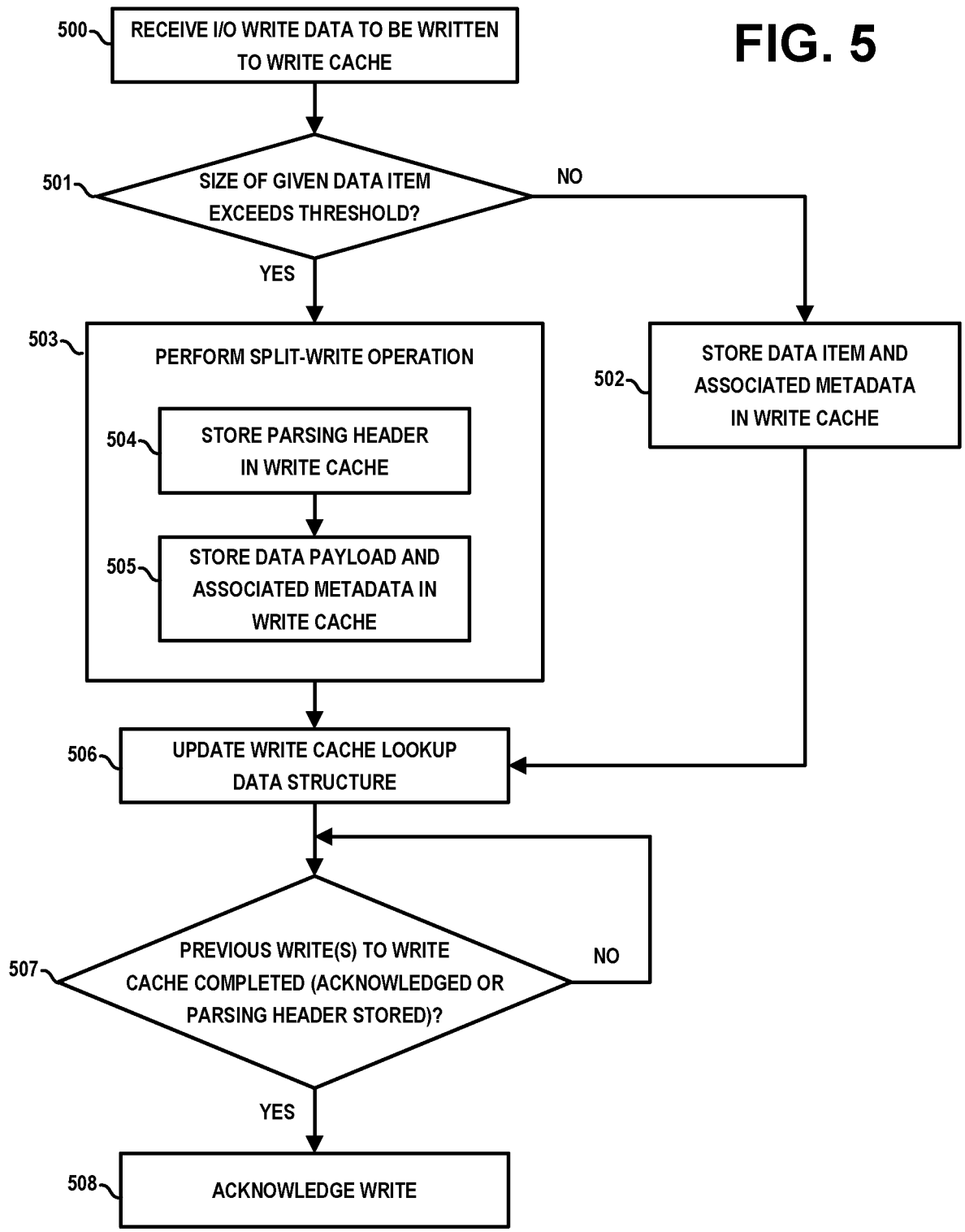
FIG. 5 illustrates a flow diagram of a method for reducing latency in write operations when utilizing a persistent write cache as a redo log, according to an exemplary embodiment of the disclosure.

FIG. 5 illustrates a flow diagram of a method for reducing latency in write operations when utilizing a persistent write cache as a redo log, according to an exemplary embodiment of the disclosure. In some embodiments, FIG. 5 illustrates an exemplary process flow that is performed by the storage control system 210 and the write cache management system 240 (FIG. 2) to store data and metadata items to a cyclic write cache (e.g., cyclic write cache 300, FIG. 3) using split write operations, according to an exemplary embodiment of the disclosure. During operation, the storage control system 210 receives I/O write requests from host systems, wherein the I/O write requests include associated data items (new data, and/or updated data) to be stored in the write cache (block 500). In some embodiments, the incoming data items are temporarily buffered in memory (e.g., RAM buffer) before writing the data items to the write cache. This allows the storage control system 210 to, e.g., (i) sort the data items in an order in which the corresponding incoming I/O write requests were received, (ii) allocate new entries in the write cache to store the data items in the respective entries, (iii) generate associated metadata and/or parsing headers for the data items to be stored in the write cache together. As noted above, parallel cache write operations can be performed concurrently to store the data items in the respective allocated cache entries using such parallel cache write operations. The new cache entries are allocated in sequency starting from a current head location of the write cache.

When a given data item is to be written to the write cache, the write cache management system 240 will perform either a single write operation, or split write operation, depending on the determined size of the given data item (block 501). If the size of the given data item does not exceed the specified size threshold (negative determination in block 501), a single write operation will be performed to store both the data item and associated metadata item (which includes associated parsing information) in the write cache (block 502). In this instance, the single cache write operation is performed to store the given data item and associated metadata item and parsing header in an allocated region (entry) in the write cache.

On the other hand, if the size of the given data item exceeds the specified size threshold (affirmative determination in block 501), a split write operation will be performed (block 503) which comprises performing a first cache write operation to store a parsing header in the write cache (block 504), and performing a second cache write operation to storage a data payload and associated metadata in the write cache (block 505). When the parsing header is successfully written to the write cache, a first acknowledge message ACK is returned to indicate that the parsing header was successfully written to the write cache.

When the entry for the given data item has been fully written to the write cache by either the single write operation (block 502) or the split write operation (block 503), a write cache lookup data structure is updated to enable random access lookup of the newly added data items in the write cache (block 506). As noted above, since writes to the write cache are acknowledged to the host, the write cache must be capable of serving reads to access the cached data items, before the data items are destaged and persistently stored in primary storage. In some embodiments, the write cache 300 is optimized for writes and not for reads and, thus, the metadata in the write cache is not random access. In such embodiments, a write cache lookup data structure is generated and maintained (in non-volatile RAM and/or persistent memory) so that the write cache can be utilized to serve read requests to the cached data items. In other embodiments, the write cache can be structured in a searchable format.

Thereafter, when the data payload and associated metadata for the given data item is successfully written to the write cache, a determination is made as to whether a second acknowledge message ACK can be returned to indicate that the data payload and associated metadata for the data item was successfully written to the write cache. In some embodiments, such determination is made by determining whether each previous single write operation has completed by returning an acknowledge message that the associated data item has been successfully written to the cache, and each previous split write operation has returned at least a first acknowledge message that the parsing header for the associated data item has been successfully written to the cache (block 507). If there it at least one previous single write operation for which an acknowledgment message has not been returned, or at least one previous split write operation for which an acknowledgment message has not been returned for at least the parsing header (negative determination in block 507), the write operation for the given data item will enter a wait state until all such previous acknowledge messages have been returned. On the other and, when each previous single write operation has returned an acknowledgment message, and each previous split write operation has returned an acknowledgment message for the associated the parsing header (affirmative determination in block 507), the storage control system 210 will return an acknowledgement for the given data item to the given host system (block 508).

In the event of any failure which causes a loss of any metadata before the metadata is persisted in a primary metadata structure, a recovery process can be performed using the write cache as a redo log, wherein the entries of the cached redo log are replayed to recover and reconstruct lost metadata. In some embodiments, in the exemplary configuration of the write cache 300 as shown in FIG. 3, a current location of the metadata pointer 310 and the data pointer 320 will be used to determine which items needed to be recovered. In the event of a failure, the write cache can be replayed, starting from a point-in-time where the changes have not been persisted and are lacking in the system, up to the point of failure. The persistent write cache provides resiliency of the metadata items before the metadata is destaged and persisted in a primary metadata structure. In this regard, it is preferable to limit the amount metadata that is contained in the write cache to limit the cost of recovering lost RAM metadata in the event of a failure, as recovery involves reading the persistent write cache, parsing through the items in the write cache, and replaying the items one at a time to reconstruct lost RAM metadata.

Figure 6:
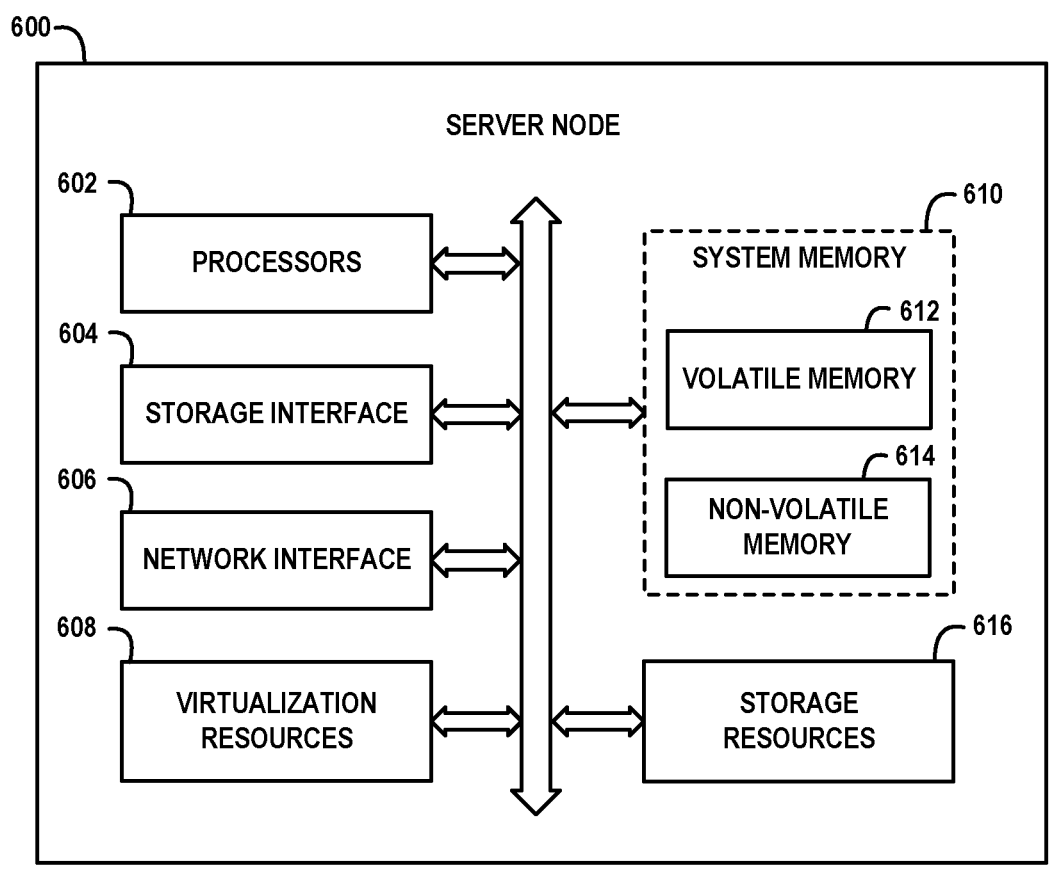
FIG. 6 schematically illustrates a framework of a server node for hosting a storage node which comprises a write cache management system that is configured to provision and manage a persistent write cache which is utilized as a redo log, according to an exemplary embodiment of the disclosure.

FIG. 6 schematically illustrates a framework of a server node for hosting a storage node which comprises a write cache management system that is configured to provision and manage a persistent write cache which is utilized as a redo log, according to an exemplary embodiment of the disclosure. The server node 600 comprises processors 602, storage interface circuitry 604, network interface circuitry 606, virtualization resources 608, system memory 610, and storage resources 616. The system memory 610 comprises volatile memory 612 and non-volatile memory 614. The processors 602 comprise one or more types of hardware processors that are configured to process program instructions and data to execute a native operating system (OS) and applications that run on the server node 600.

For example, the processors 602 may comprise one or more CPUs, microprocessors, microcontrollers, application specific integrated circuits (ASICs), field programmable gate arrays (FPGAs), and other types of processors, as well as portions or combinations of such processors. The term "processor" as used herein is intended to be broadly construed so as to include any type of processor that performs processing functions based on software, hardware, firmware, etc. For example, a "processor" is broadly construed so as to encompass all types of hardware processors including, for example, (i) general purpose processors which comprise "performance cores" (e.g., low latency cores), and (ii) workload-optimized processors, which comprise any possible combination of multiple "throughput cores" and/or multiple hardware-based accelerators. Examples of workload-optimized processors include, for example, graphics processing units (GPUs), digital signal processors (DSPs), system-on-chip (SoC), tensor processing units (TPUs), image processing units (IPUs), deep learning accelerators (DLAs), artificial intelligence (AI) accelerators, and other types of specialized processors or coprocessors that are configured to execute one or more fixed functions.

The storage interface circuitry 604 enables the processors 602 to interface and communicate with the system memory 610, the storage resources 616, and other local storage and off-infrastructure storage media, using one or more standard communication and/or storage control protocols to read data from or write data to volatile and non-volatile memory/ storage devices. Such protocols include, but are not limited to, NVMe, PCIe, PATA, SATA, SAS, Fibre Channel, etc. The network interface circuitry 606 enables the server node 600 to interface and communicate with a network and other system components. The network interface circuitry 606 comprises network controllers such as network cards and resources (e.g., network interface controllers (NICs) (e.g., SmartNICs, RDMA-enabled NICs), Host Bus Adapter (HBA) cards, Host Channel Adapter (HCA) cards, I/O adaptors, converged Ethernet adaptors, etc.) to support communication protocols and interfaces including, but not limited to, PCIe, DMA and RDMA data transfer protocols, etc.

The virtualization resources 608 can be instantiated to execute one or more services or functions which are hosted by the server node 600. For example, the virtualization resources 608 can be configured to implement the various modules and functionalities of a storage control system and associated write cache management system as discussed herein. In one embodiment, the virtualization resources 608 comprise virtual machines that are implemented using a hypervisor platform which executes on the server node 600, wherein one or more virtual machines can be instantiated to execute functions of the server node 600. As is known in the art, virtual machines are logical processing elements that may be instantiated on one or more physical processing elements (e.g., servers, computers, or other processing devices). That is, a "virtual machine" generally refers to a software implementation of a machine (i.e., a computer) that executes programs in a manner similar to that of a physical machine. Thus, different virtual machines can run different operating systems and multiple applications on the same physical computer.

A hypervisor is an example of what is more generally referred to as "virtualization infrastructure." The hypervisor runs on physical infrastructure, e.g., CPUs and/or storage devices, of the server node 600, and emulates the CPUs, memory, hard disk, network and other hardware resources of the host system, enabling multiple virtual machines to share the resources. The hypervisor can emulate multiple virtual hardware platforms that are isolated from each other, allowing virtual machines to run, e.g., Linux and Windows Server operating systems on the same underlying physical host system. The underlying physical infrastructure may comprise one or more commercially available distributed processing platforms which are suitable for the target application.

In another embodiment, the virtualization resources 608 comprise containers such as Docker containers or other types of Linux containers (LXCs). As is known in the art, in a container-based application framework, each application container comprises a separate application and associated dependencies and other components to provide a complete filesystem, but shares the kernel functions of a host operating system with the other application containers. Each application container executes as an isolated process in user space of a host operating system. In particular, a container system utilizes an underlying operating system that provides the basic services to all containerized applications using virtual-memory support for isolation. One or more containers can be instantiated to execute one or more applications or functions of the server node 600 as well as to execute one or more of the various modules and functionalities of a storage control system as discussed herein. In yet another embodiment, containers may be used in combination with other virtualization infrastructure such as virtual machines implemented using a hypervisor, wherein Docker containers or other types of LXCs are configured to run on virtual machines in a multi-tenant environment.

In some embodiments, the constituent components and modules of storage control systems and associated write cache managing systems as discussed herein are implemented using program code that is loaded into the system memory 610 (e.g., volatile memory 612), and executed by the processors 602 to perform respective functions as described herein. In this regard, the system memory 610, the storage resources 616, and other memory or storage resources as described herein, which have program code and data tangibly embodied thereon, are examples of what is more generally referred to herein as "processor-readable storage media" that store executable program code of one or more software programs. Articles of manufacture comprising such processor-readable storage media are considered embodiments of the disclosure. An article of manufacture may comprise, for example, a storage device such as a storage disk, a storage array or an integrated circuit containing memory. The term "article of manufacture" as used herein should be understood to exclude transitory, propagating signals.

The system memory 610 comprises various types of memory such as volatile RAM, NVRAM, or other types of memory, in any combination. The volatile memory 612 may be a dynamic random-access memory (DRAM) (e.g., DRAM DIMM (Dual In-line Memory Module), or other forms of volatile RAM. The non-volatile memory 614 may comprise one or more of NAND Flash storage devices, SSD devices, or other types of non-volatile memory devices. The system memory 610 can be implemented using a hierarchical memory tier structure wherein the volatile memory 612 is configured as the highest-level memory tier, and the non-volatile memory 614 (and other additional non-volatile memory devices which comprise storage-class memory) is configured as a lower level memory tier which is utilized as a high-speed load/store non-volatile memory device on a processor memory bus (i.e., data is accessed with loads and stores, instead of with I/O reads and writes). The term "memory" or "system memory" as used herein refers to volatile and/or non-volatile memory which is utilized to store application program instructions that are read and processed by the processors 602 to execute a native operating system and one or more applications or processes hosted by the server node 600, and to temporarily store data that is utilized and/or generated by the native OS and application programs and processes running on the server node 600. The storage resources 616 can include one or more HDDs, SSD storage devices, etc.

It is to be understood that the above-described embodiments of the disclosure are presented for purposes of illustration only. Many variations may be made in the particular arrangements shown. For example, although described in the context of particular system and device configurations, the techniques are applicable to a wide variety of other types of information processing systems, computing systems, data storage systems, processing devices and distributed virtual infrastructure arrangements. In addition, any simplifying assumptions made above in the course of describing the illustrative embodiments should also be viewed as exemplary rather than as requirements or limitations of such embodiments. Numerous other alternative embodiments within the scope of the appended claims will be readily apparent to those skilled in the art.

What is claimed is:

1. A method, comprising:
    receiving, by a storage control system, a first write request and a second write request following the first write request, wherein the first write request comprises a first data item to be written to a primary storage, and the second write request comprises a second data item to be written to the primary storage;
    performing, by the storage control system, a first cache write operation to write the first data item to a persistent write cache, and a second cache write operation to write the second data item to the persistent write cache, wherein the first and second cache write operations are performed in parallel;
    wherein the first cache write operation comprises a split write operation which comprises writing a parsing header for the first data item to the persistent write cache, and writing a payload of the first data item to the persistent write cache; and
    wherein the second cache write operation comprises storing the second data item and an associated metadata item in the persistent write cache, and waiting at least for an acknowledgment that the parsing header for the first data item has been successfully written to the persistent write cache before returning an acknowledgment to a host that the second data item is successfully stored in the primary storage in response to the second data item and the associated metadata item being stored in the persistent write cache.

2. The method of claim 1, wherein the persistent write cache comprises a cyclic buffer.

3. The method of claim 1, wherein the parsing header for the first data item comprises information regarding a location of an entry in the persistent write cache which comprises the second data item and the associated metadata.

4. The method of claim 1, wherein the parsing header comprises first error detection information which is utilized to determine a validity of the parsing header for the first data item, and second error detection information which is utilized to determine a validity of the payload of the first data item.

5. The method of claim 1, further comprising:
    determining, by the storage control system, a size of the second data item; and
    performing, by the storage control system, the split write operation in response to determining that the size of the second data item exceeds a specified size threshold.

6. The method of claim 1, further comprising utilizing, by the storage control system, the persistent write cache as a cyclic redo log to recover and reconstruct metadata that is lost as a result of a failure.

7. The method of claim 6, wherein utilizing the persistent write cache as a cyclic redo log comprises replaying entries of the persistent write cache in a cyclic write order starting from a metadata pointer of the persistent write cache up to a point of failure, wherein the metadata pointer points to a location of a first metadata item, in the cyclic write order from a tail location to a head location of the persistent write cache, which has not been persisted in a primary metadata storage.

8. The method of claim 7, wherein replaying entries of the persistent write cache in the cyclic write order comprises parsing the entries of the persistent write cache using one or more of cached metadata items and cached parsing headers associated with the entries in the persistent write cache that were written using split write operations.

9. An article of manufacture comprising a non-transitory processor-readable storage medium having stored therein program code of one or more software programs, wherein the program code is executable by one or more processors to implement a method which comprises:
    receiving, by a storage control system, a first write request and a second write request following the first write request, wherein the first write request comprises a first data item to be written to a primary storage, and the second write request comprises a second data item to be written to the primary storage;
    performing, by the storage control system, a first cache write operation to write the first data item to a persistent write cache, and a second cache write operation to write the second data item to the persistent write cache, wherein the first and second cache write operations are performed in parallel;
    wherein the first cache write operation comprises a split write operation which comprises writing a parsing header for the first data item to the persistent write cache, and writing a payload of the first data item to the persistent write cache; and
    wherein the second cache write operation comprises storing the second data item and an associated metadata item in the persistent write cache, and waiting at least for an acknowledgment that the parsing header for the first data item has been successfully written to the persistent write cache before returning an acknowledgment to a host that the second data item is successfully stored in the primary storage in response to the second data item and the associated metadata item being stored in the persistent write cache.

10. The article of manufacture of claim 9, wherein the persistent write cache comprises a cyclic buffer.

11. The article of manufacture of claim 9, wherein the parsing header for the first data item comprises information regarding a location of an entry in the persistent write cache which comprises the second data item and the associated metadata.

12. The article of manufacture of claim 9, wherein the parsing header comprises first error detection information which is utilized to determine a validity of the parsing header for the first data item, and second error detection information which is utilized to determine a validity of the payload of the first data item.

13. The article of manufacture of claim 9, further comprising program code which is executable by the one or more processors to implement a method which comprises:
  determining, by the storage control system, a size of the second data item; and
  performing, by the storage control system, the split write operation in response to determining that the size of the second data item exceeds a specified size threshold.

14. The article of manufacture of claim 9, further comprising program code which is executable by the one or more processors to implement a method which comprises utilizing, by the storage control system, the persistent write cache as a cyclic redo log to recover and reconstruct metadata that is lost as a result of a failure.

15. The article of manufacture of claim 14, wherein the program code for utilizing the persistent write cache as a cyclic redo log comprises program code for replaying entries of the persistent write cache in a cyclic write order starting from a metadata pointer of the persistent write cache up to a point of failure, wherein the metadata pointer points to a location of a first metadata item, in the cyclic write order from a tail location to a head location of the persistent write cache, which has not been persisted in a primary metadata storage.

16. An apparatus comprising:
  at least one processor; and
  memory configured to store program code, wherein the program code is executable by the at least one processor to instantiate a storage control system, wherein the storage control system is configured to:
    receive a first write request and a second write request following the first write request, wherein the first write request comprises a first data item to be written to a primary storage, and the second write request comprises a second data item to be written to the primary storage;
    perform a first cache write operation to write the first data item to a persistent write cache, and a second cache write operation to write the second data item to the persistent write cache, wherein the first and second cache write operations are performed in parallel;
    wherein the first cache write operation comprises a split write operation which comprises writing a parsing header for the first data item to the persistent write cache, and writing a payload of the first data item to the persistent write cache; and
    wherein the second cache write operation comprises storing the second data item and an associated metadata item in the persistent write cache, and waiting at least for an acknowledgment that the parsing header for the first data item has been successfully written to the persistent write cache before returning an acknowledgment to a host that the second data item is successfully stored in the primary storage in response to the second data item and the associated metadata item being stored in the persistent write cache.

17. The apparatus of claim 16, wherein the persistent write cache comprises a cyclic buffer.

18. The apparatus of claim 16, wherein the parsing header for the first data item comprises:
  information regarding a location of an entry in the persistent write cache which comprises the second data item and associated metadata;
  first error detection information which is utilized to determine a validity of the parsing header for the first data item; and
  second error detection information which is utilized to determine a validity of the payload of the first data item.

19. The apparatus of claim 16, wherein the storage control system is further configured to:
  determine a size of the second data item; and
  perform the split write operation in response to determining that the size of the second data item exceeds a specified size threshold.

20. The apparatus of claim 16, wherein the storage control system is further configured to utilize the persistent write cache as a cyclic redo log to recover and reconstruct metadata that is lost as a result of a failure.

* * * * *